March 9, 1954
C. B. RICHEY
2,671,570
BUCK RAKE AND STACKING DEVICE
Filed Jan. 12, 1950
4 Sheets-Sheet 1
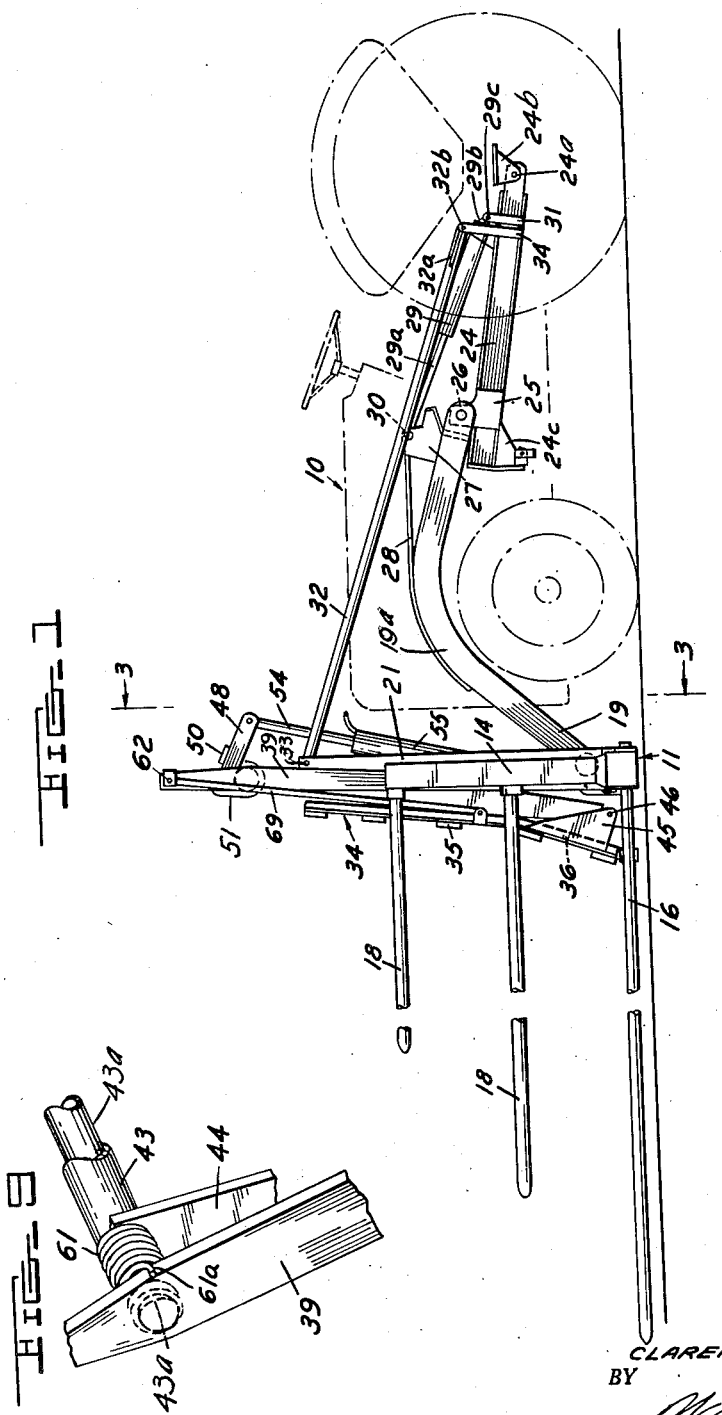
INVENTOR.
CLARENCE B. RICHEY
BY
ATTORNEY March 9, 1954
C. B. RICHEY
2,671,570
BUCK RAKE AND STACKING DEVICE
Filed Jan. 12, 1950
4 Sheets-Sheet 2
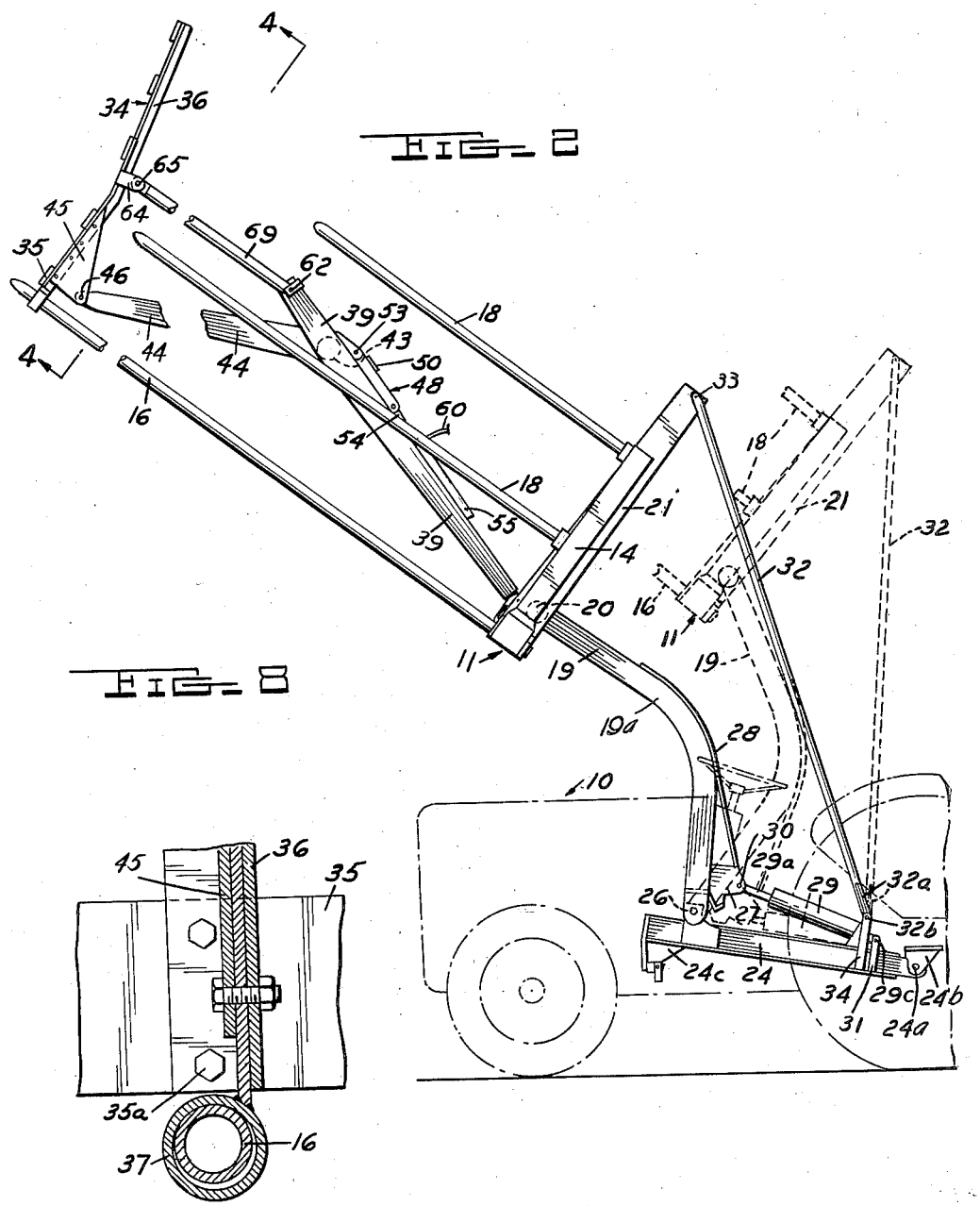
INVENTOR.
CLARENCE B. RICHEY
BY
ATTORNEY March 9, 1954         C. B. RICHEY         2,671,570
BUCK RAKE AND STACKING DEVICE
Filed Jan. 12, 1950         4 Sheets-Sheet 3
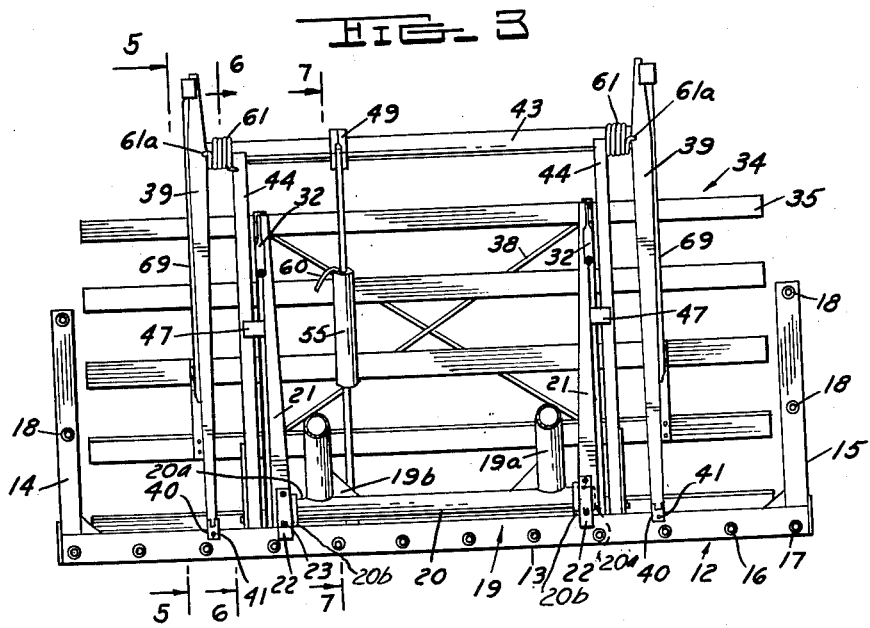
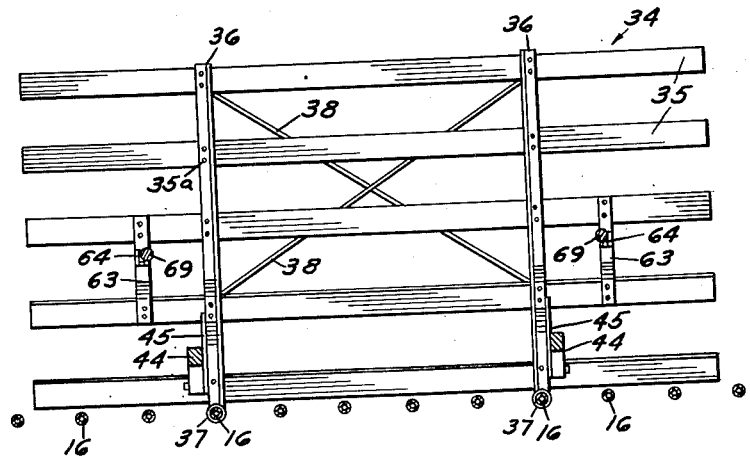
INVENTOR.
CLARENCE B. RICHEY
BY
ATTORNEY

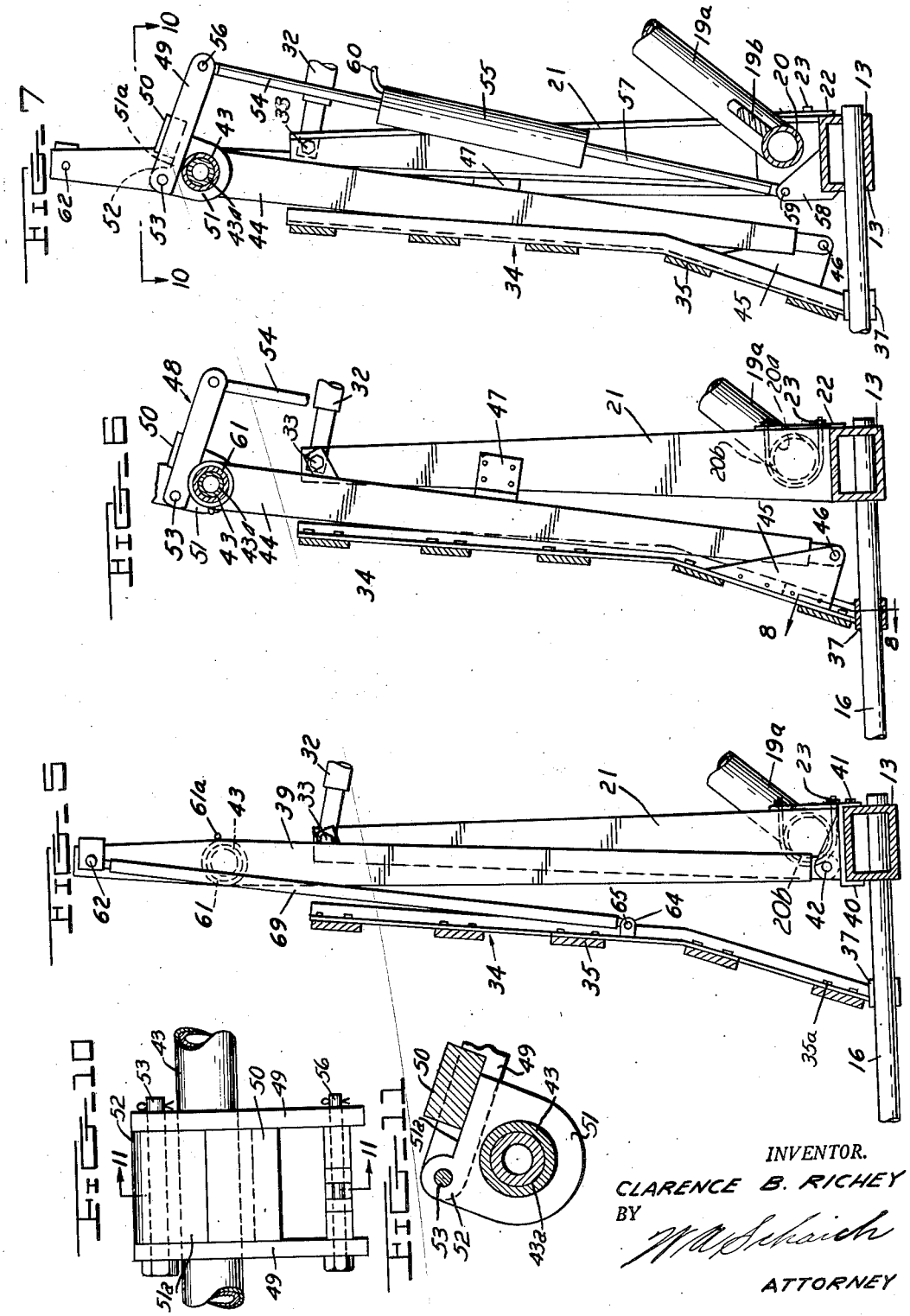

Patented Mar. 9, 1954

2,671,570

UNITED STATES PATENT OFFICE 2,671,570

BUCK RAKE AND STACKING DEVICE

Clarence B. Richey, Royal Oak, Mich., assignor to Dearborn Motors Corporation, Highland Park, Mich., a corporation of Delaware Application January 12, 1950, Serial No. 138,217

5 Claims. (Cl. 214—510)

This invention relates to a tractor mounted buck rake for picking up and transporting loose bulky material and a push-off device for such rake for subsequent removal of the load from the buck rake.

Buck rakes when mounted on a tractor are exceedingly useful implements for transporting loose hay or other similar crops from the field to the barn or other desired location. The material to be gathered by the buck rake can, of course, be quickly scooped up from the swath or windrow and elevated to a transporting position. Unfortunately, however, many buck rakes when loaded and raised to a transporting position over the tractor destroy the equilibrium of the tractor as the load generally falls on the front end of such tractor. Obviously poor weight distribution of the load carried by the tractor can also result in harder steering thus increasing the difficulty in traversing the farm terrain. Furthermore, most of the buck rakes when elevated to a transport position with a full load, obscure the vision of the tractor operator, thereby making operation of such a loaded tractor extremely hazardous.

In addition buck rakes heretofore utilized have not been provided with satisfactory push off devices such known devices being of complicated and expensive construction and cumbersome and unreliable in operation.

Accordingly, it is an object of this invention to provide an improved tractor mounted material handling device so constructed that the transport position of the loaded device is centrally above the tractor, whereby the load is substantially equally distributed on the tractor and the vision of the operator is unimpaired.

Another object of this invention is to provide an improved power operated push-off device for a buck rake, characterized by unusual simplicity of construction and reliability of operation.

Still another object of this invention is to provide a fully extendable power operated push-off device for a buck rake which will completely remove the load carried by the buck rake.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a buck rake embodying this invention including a push-off device shown mounted on a tractor in its lowered position and with the push-off device retracted.

Figure 2 is a view similar to Figure 1 but showing the buck rake in the partially raised position and the push-off device in the extended position, with the fully raised portion of the rake indicated in dotted outline.

Figure 3 is a cross sectional view taken along the plane 3—3 of Figure 1.

Figure 4 is a cross sectional view taken along the plane 4—4 of Figure 2 showing a rear view of the gate.

Figure 5 is a cross sectional view taken along the plane 5—5 of Figure 3.

Figure 6 is a cross sectional view taken along the plane 6—6 of Figure 3.

Figure 7 is a cross sectional view taken along the plane 7—7 of Figure 3.

Figure 8 is an enlarged cross sectional view taken along the line 8—8 of Figure 6.

Figure 9 is a detail fragmentary perspective view of the push-off gate return spring.

Figure 10 is an enlarged sectional view taken along the plane 10—10 of Figure 7.

Figure 11 is an enlarged sectional view taken along the plane 11—11 of Figure 10.

As shown on the drawings:

Briefly, as applied to a buck rake type of material handling device, this invention comprises a frame provided with a plurality of forwardly projecting hay gathering tines and such frame is pivotally connected to a U-shaped lifting member which in turn is pivotally mounted on the tractor for vertical movement.

A pair of hydraulic cylinders associated with the U-shaped lifting member are utilized to raise and lower such member for elevating the buck rake to a transporting position centrally over the tractor. A push-off device or gate is slidably mounted on the tines of the buck rake. A system of levers forming a folding gate type of linkage is mounted between the gate and the buck rake frame and is actuable by a hydraulic cylinder to extend such gate and thus remove the load carried by the buck rake. The various hydraulic cylinders of the buck rake may be conveniently operated by pressured fluid supplied by the built-in hydraulic system of the tractor.

In Figure 1 there is shown a tractor 10 of well-known make on which there is mounted a buck rake 11. Buck rake 11 comprises a vertically disposed U-shaped frame 12 having a base portion 13 of box-like construction and two spaced apart uprights 14 and 15 secured respectively as by welding at opposite ends of base portion 13. A plurality of forwardly extending tubular tines 16 provided with closed end points are secured within suitable transverse spaced apertures 17 in base portion 13 and a pair of vertically spaced tines 18 are provided in each upright 14 and 15. Tines 16 and 18 are provided for gathering the hay or other material to be scooped up by the buck rake.

Buck rake 11 is pivotally mounted on a substantially U-shaped lifting member 19, the bight portion of such lifting member comprising a tubular cross shaft 20 welded to rearwardly extending arm members 19a and reinforced by gusset plates 19b welded into the corners as best shown in Figure 3. The ends 20a of cross shaft 20 project beyond arm members 19a. A pair of vertically disposed arms 21 are secured in transversely spaced relationship on top of base portion 13 of frame 12 as by welding. Shaft 20 is disposed transversely of arms 21 and the ends 20a of such shaft are respectively rotatably mounted in the adjacent arms 21 spaced slightly above base portion 13, and additionally secured by a pair of U-bolts 23, each of which surrounds a sleeve 20b surrounding shaft 20, and projects through a reinforcing plate 22 welded to base portion 13 at the foot of each arm 21 and to each arm 21.

Lifting arm members 19a are arcuately shaped to clear the tractor front axle when rake 11 rests on the ground as shown in Figure 1. The rear ends of members 19 are respectively pivotally secured to channel iron frames 24 mounted on each side of tractor 10. The rear end of each frame 24 is secured by a transverse bolt 24a to a bracket 24b depending respectively from each side of the rear axle housing (not shown) of tractor 10. The front end of each frame 24 is secured to the frame (not shown) of the tractor by a bracket 24c. The rear end portions of lifting member 19 are bifurcated and are pivotally secured respectively to upstanding lugs 26 provided near the front end of each frame 24. On top of and near the rear end portions of lifting member 19 there is welded a vertical plate-like lever 27. A reinforcing rod 28 is welded to the top of lever 27 and to the top of arcuate portion of each arm of lifting member 19.

A pair of hydraulic cylinders 29, one on each side of tractor 10, are provided to raise lifting member 19. An axial plunger 29a extending forwardly from each cylinder is pivotally secured to the top portion of the respective lever 27 by a transverse bolt 30. An ear 29b on the other end of the cylinder 29 is pivotally secured by a bolt 29c to a mounting bracket 31 provided on the rear of frame 24. Cylinders 29 are connected to the source of pressured hydraulic fluid in the tractor (not shown) by suitable pipes or conduits and a control valve (not shown) whereby such cylinders may be actuated to raise the buck rake 11 as will later be described. A tubular link 32 is pivotally connected at one end to the top of each of the upright arms 21 of the buck rake by a transverse bolt 33. The other end of each link 32 is provided with a longitudinal slot 32a and a transverse bolt 32b cooperates with such slot to pivotally connect the other end of such links respectively to arms 34 secured near the rear end of each frame 24. Slots 32a permit limited longitudinal movement of links 32 for a purpose to be later described.

A gate 34 comprising a plurality of wooden slats 35 secured by bolts 35a in spaced relation to a pair of spaced vertically disposed angle iron supports 36 is slidably mounted on a selected pair of tines 16. A ring 37 is secured to the bottom of each vertical support member 36 as by welding and such ring is slidably mounted upon a suitable tine 16 as shown in Figure 4. A pair of diagonally disposed braces 38 are bolted or otherwise secured to supports 36 thus providing a rigid substantially unitary member.

A pair of transversely spaced normally vertical links 39 are pivotally mounted on base portion 13 of frame 12 within a bifurcated bracket 40 secured by a bolt 41 to base portion 13 outwardly of each vertical arm 21. The bottom end of each link 39 is of reduced thickness and a transverse pin 42 pivotally secures the bottom end of each link 39 to bracket 40. A tubular link member 69 is pivotally connected at one end by a transverse bolt 62 to the upper end of each link 39, on the outside face thereof. The other end of each link 69 is pivotally connected to a point slightly below the vertical center of gate 34. A pair of vertical bars 63 are secured across a pair of slats 35 at respective ends thereof, and each bar 63 supports a mounting lug 64 to which the end of link 69 is pivotally secured by bolt 65.

A horizontal tubular shaft 43 is rotatably mounted on an inserted shaft 39a which has its ends respectively secured, as by welding, to links 39 near the top thereof as shown in Figures 3 and 9. A pair of spaced depending levers 44 are rigidly secured by welding to cross shaft 43 respectively adjacent links 39. The bottom end of each lever 44 is pivotally mounted on the rearmost apex of a triangular shaped plate 45 riveted or bolted to the lower end of each support 36, a transverse bolt 46 securing such bottom end to plate 45. An angular stop 47 is bolted or otherwise secured to the inside face of each arm 21 to arrest the rearward movement of levers 44 as will be explained later.

A rearwardly projecting actuating lever 48 is mounted on cross shaft 43 and such lever comprises a pair of spaced lever bars 49 separated by a block-like stop member 50 welded to the inside face of each bar 49 as shown in Figure 7. One end of lever 48 is pivotally mounted on a ring-like bracket member 51, such member surrounding cross shaft 43 and is welded in the position shown in Figure 7. Ring 51 is provided with an integral vertical lug portion 52, which fits between the forward end portion of lever 48, and a transverse bolt 53 pivotally secures lever 48 to such lug portion. Adjacent lug 52 and extending rearwardly thereof, there is provided a substantially horizontal cam surface 51a and block 50 abuts such surface when the gate is in the retracted position shown in Figure 7. A piston rod 54 extending out of a pull type hydraulic cylinder 55 is pivotally secured by a transverse bolt 56 between the rear ends of the separated bars of lever 48. A rod 57 extending out of the bottom of hydraulic cylinder 55 is pivotally secured by a transverse bolt 59 to a substantially triangular shaped plate-like bracket 59 welded to base portion 13.

Hydraulic cylinder 55 is connected to the tractor's source of pressured hydraulic fluid (not shown) by suitable conduits 60 and a control valve (not shown). Gate 34 is returned from the extended position by a pair of torsion springs 61 respectively surrounding each end of cross shaft 43 adjacent the inside face of each lever 39. One end 61a of each spring 61 bears against the rearward facing edge of lever 39 while the other end (not shown) of each spring 61 is secured to cross shaft 43 in suitable fashion.

In the operation of the buck rake of this invention, to scoop up a stack of hay or other similar loose material, the buck rake is lowered to the position shown in Figure 1 by releasing the pressured fluid from hydraulic cylinders 29. The tractor is then driven forwardly, tines 16 sliding underneath the stack of hay and when such stack is transferred to the buck rake, the hydraulic cylinders 29 are actuated to raise lifting member 19 to the extreme position shown in Figure 2. Slots 32a in links 32 permit limited pivotal movement of the rake during such operation in order that the tines can readily follow the ground contour and thus avoid any damage thereto. Stops 47 assist in preventing further rearward movement of gate 34 when the rake is in the elevated position. Further upward movement of the buck rake is effectively limited by the hydraulic cylinder 29 which becomes fully telescoped, when the rake is raised beyond the position shown in Figure 2, as indicated in dotted outline. The weight distribution of the loaded buck rake is then transferred largely to the approximate center of gravity of the tractor, and in any event, the center of gravity of the loaded rake is disposed within the projected area bounded by the tractor wheels, hence the load distribution on the wheels is more nearly equal. Links 32 are, of course, in tension and will thus stabilize the buck rake in the raised position.

When the buck rake is elevated to the position shown in Figure 2, the operator of the tractor has unobstructed vision underneath the elevated buck rake, hence facilitating driving of the loaded tractor to the desired location. The load may then be removed from the buck rake in any position of elevation of buck rake 16 from the lowered position shown in Figure 1 to the extreme elevated position shown in Figure 2. By manipulation of a suitable control valve to actuate hydraulic cylinder 55, gate 34 is moved forwardly to force the load from buck rake 16 by extending the folding gate or jackknife linkage comprising links 39 and levers 44. Upon actuation of hydraulic cylinder 55, piston rod 54 is retracted and upon retraction of such piston rod, lever 48 connected thereto is rotated in a clockwise direction as viewed in Figures 1 and 7. Block 50 being in contact with the cam surface 51a of link 51 effects rotation of cross shaft 43 as if the arms 49 were rigidly connected with the cross shaft 43, thereby forcing arms 44 affixed to shaft 43 to move outwardly thus initiating movement of gate 34 along tines 16. Continued retraction of piston rod 54 by hydraulic cylinder 55 then forces shaft 43 to move to the left as shown in Figure 7, and block 50 rides off of cam surface 51a as shaft 43 is rotated. When block 50 is no longer on cam surface 51a, an effective pivoted connection is provided between the arms 49 and the cross shaft 43, so that the further rotation of shaft 43 is effected only by the application of tension forces by the arm 49 to the lug 52 and the pin 53. The movement which moves shaft 43 to the left is permitted by the pivotal connection of links 39 to base portion 13 of buck rake frame 11. Links 69 being pivotally connected to the upper ends of links 39 and gate 34 also assist in forcing such gate to slide along tines 16, and more important, control the vertical position of the gate 34, imparting a slight tilt to such gate at its outermost position to facilitate the complete removal of hay from the rake. Continued retraction of piston rod 54 effects still further rotation of the levers 44 and the links 39 until gate 34 reaches the extreme extended position shown in Figure 2. At this point piston 54 is fully retracted and thus automatically acts as a stop which limits the extension of gate 34. Note that each lateral edge of gate 34 is equally advanced at all times due to the rigid interconnection of links 39 by inserted shaft 43a, and the rigid interconnection of arms 44 by cross shaft 43.

It will thus be readily apparent that the load may be completely pushed off of tines 16 and stacked or deposited where desired. Retraction of gate 34 is effected by releasing the pressured fluid in cylinder 55. Torsion springs 61 surrounding each end of shaft 43, assisted by gravity, then return gate 34 to the retracted position whereupon the buck rake is again ready for loading.

From the foregoing description it is clearly apparent that there is here provided a buck rake which is readily mounted on a tractor and conveniently usable for engaging and transporting a stack of loose bulky material. The load distribution of the buck rake when in the elevated position over the tractor is so well distributed on the tractor to maintain the tractor in equilibrium. It is obvious therefore that the steering of the tractor will not be impaired; furthermore, the load is elevated to such a height that the vision of the operator remains unobscured. The push-off device of this invention easily forces the entire load off of the buck rake from any elevated position of the buck rake and thus permits the convenient building of hay or straw stacks. As the working parts of the push-off device are comparatively few in number and of simple design, only a minimum of up-keep and attention is required to maintain the push-off device in working order.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a tractor mounted buck rake, a single transversely disposed main frame element mounted forwardly of the tractor, a plurality of forwardly extending tines secured to said main frame element, a stacking device comprising a pusher gate slidably mounted on said tines for movement therealong from a retracted position to an extended position, a pair of transversely spaced members substantially vertical when said gate is in retracted position pivotally mounted on said main frame element, a transverse shaft pivotally mounted between said members parallel to and above said main frame element, lever arms respectively secured in substantially vertically depending relationship to said shaft, the lower end of each of said lever arms being pivotally connected to said gate, a bracket on said shaft, hydraulically operated means connected between said bracket and said single main frame element, the connection of said hydraulically operated means to said frame element being in substantial alignment with the attachment of said members thereto, and means for retaining said gate in substantially upright position during its forward movement, whereby said shaft is rotated upon actuation of said hydraulic operating means to extend said members and lever arms in jackknife fashion to move said gate forwardly along the tines, said hydraulic means moving with said members and lever arms to continuously rotate said shaft as said gate is displaced forwardly, and said members and said hydraulic operating means directly imposing upon said single main frame element, the reaction thrust produced in moving said gate.

2. The invention defined in claim 1, wherein the last-mentioned means comprises a linkage pivotally connected between each of said members and said gate to maintain said gate substantially upright throughout its range of movement, and a torsion spring mounted between said levers and said link arms to fold said levers and link arms in jackknife fashion for retraction of said gate.

3. In a tractor mounted buck rake having a fixed transversely disposed main frame element, laterally spaced uprights secured at their lower ends to said main frame elements and a plurality of transversely spaced forwardly extending tines secured to the main frame element, a stacking device comprising a pusher gate slidably mounted on said tines, a member having one end pivotally mounted on said main frame element for movement in a vertical plane, a pivoted transverse shaft supported by said member above said tines, a lever arm pivotally interconnecting said shaft and said gate, and hydraulically actuated means including a hydraulic cylinder operatively connected to said shaft and said main frame element respectively and actuatable to rotate said shaft for relatively pivoting said member and said lever arm in jackknife fashion to move said gate outwardly, and means for retaining said gate in substantially upright position during its outward movement, said member and said cylinder being supported by said main frame element in substantial transverse alignment to transfer the reaction forces of said gate thereagainst upon gate movement, and said transverse alignment of said member and said cylinder accommodating concurrent movement thereof during outward gate movement.

4. In a stacking device for a tractor mounted buck rake having a transverse frame element supporting longitudinal tines, a pusher gate slidably mounted on said tines, a pair of transversely spaced links having their lower rear ends pivotally mounted on said frame element, a transversely extending tubular shaft rotatably mounted between and joining the free upper ends of said links, a pair of spaced depending arm members secured to said shaft and pivotally connected to said gate, a bracket member on said shaft, said bracket member having a substantially horizontal top bearing surface, an arm pivotally mounted on said bracket member and having one end projecting therebeyond, means on a medial portion of said arm engageable with said bearing surface, hydraulically operated means connected between said one arm end and said frame element for rotating said shaft to pivot said links as pressure is transmitted to said bearing surface by said surface engaging means on said arms, whereby said gate is moved to an extended position, and means for retaining said gate in a substantially upright position during its movement toward said extended position.

5. In a tractor mounted buck rake having a transverse main frame element and a plurality of forwardly extending tines anchored at their rear ends to said main frame element, a push-off device comprising a pusher gate movable along said tines, a pair of transversely spaced links pivotally mounted on said main frame element for movement to a vertical plane, a first shaft mounted between said levers adjacent to their upper ends, a second tubular shaft journaled on said first shaft, a lever arm having one end secured to said second tubular shaft and its other end pivotally connected to a lower portion of said gate, extensible means for rotating said second shaft, said extensible means being pivotally anchored to said main frame element in substantially coaxial relation with said links and being pivotal therewith to continuously rotate said shaft during push-off movement of said gate, said main frame element resisting the reaction thrust of said gate as transmitted thereto by said links and said means, thereby unfolding said lever arms relative to said links to move said gate outwardly relative to said tines, and means for retaining said gate in substantially vertical position during its outward movement.

CLARENCE B. RICHEY.

References Cited in the file of this patent

UNITED STATES PATENTS

| Number | Name | Date |
|---|---|---|
| 2,286,947 | Bankson | June 16, 1942 |
| 2,311,523 | Cope et al. | Feb. 16, 1943 |
| 2,397,045 | Richey | Mar. 19, 1946 |
| 2,397,046 | Richey | Mar. 19, 1946 |
| 2,418,661 | Palm | Apr. 8, 1947 |
| 2,493,397 | Fourman | Jan. 3, 1950 |
| 2,496,039 | Crawford | Jan. 31, 1950 |
| 2,503,522 | Struthers et al. | Apr. 11, 1950 |
| 2,531,993 | Smith | Nov. 28, 1950 |
| 2,542,150 | Luebbers | Feb. 20, 1951 |